United States Patent
Wakui

[19]
[11] Patent Number: 6,023,292
[45] Date of Patent: *Feb. 8, 2000

[54] CAMERA HAVING DATA TRANSMISSION FUNCTION

[75] Inventor: Yoshio Wakui, Tokyo, Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/748,807

[22] Filed: Nov. 15, 1996

[30] Foreign Application Priority Data

Nov. 17, 1995 [JP] Japan ................................ 7-323908

[51] Int. Cl.⁷ .................................................. H04N 5/225
[52] U.S. Cl. ........................................... 348/207; 348/211
[58] Field of Search ...................... 348/207, 211, 348/348, 552, 15; 396/139, 106, 56, 57, 108, 109

[56] References Cited

U.S. PATENT DOCUMENTS

| | | | |
|---|---|---|---|
| 4,313,655 | 2/1982 | Hell et al. ................................ | 396/99 |
| 4,490,036 | 12/1984 | Anagnostopoulos ..................... | 396/106 |
| 4,533,241 | 8/1985 | Masunaga et al. ...................... | 396/106 |
| 4,621,917 | 11/1986 | Kaneda ................................... | 396/106 |
| 5,014,080 | 5/1991 | Miyadera . | |
| 5,051,766 | 9/1991 | Nonaka et al. ......................... | 396/103 |
| 5,353,090 | 10/1994 | Kato ....................................... | 396/111 |
| 5,361,115 | 11/1994 | Ohtsuka et al. ......................... | 396/58 |
| 5,570,220 | 10/1996 | Matsumoto et al. .................... | 348/343 |
| 5,634,144 | 5/1997 | Mauro et al. ............................ | 396/57 |
| 5,642,458 | 6/1997 | Fukushima et al. ..................... | 386/46 |

*Primary Examiner*—Wendy Garber
*Assistant Examiner*—Aung S. Moe
*Attorney, Agent, or Firm*—Greenblum & Bernstein P.L.C.

[57] ABSTRACT

A camera provided with a distance measuring system having an infrared light emitting element, and an infrared light receiving element. The infrared light emitted by the emitting element and reflected by an object is received by the light receiving element, and based on a point where the reflected infrared light is incident to the light receiving element, an object distance is determined. In such a camera, the light emitting element is used for sending data by emitting a modulated infrared light. Similarly, the light receiving element is used for receiving data. Further, the light emitting angular range is changed in accordance with whether the emitted light is used for distance measuring or the data transmission.

7 Claims, 8 Drawing Sheets

CAMERA HAVING DATA TRANSMISSION FUNCTION

BACKGROUND OF THE INVENTION

The present invention relates to a camera having a data transmission function for sending and/or receiving data to/from an externally provided device such as a computer.

Recently, digital cameras have become well known. For example, a digital camera captures an image of an object, stores the image data as digital image data in a memory, and then transmits the digital image data to an externally provided device, such as a computer. Generally, the data is transmitted through a cable (e.g., a SCSI cable, an RS-232C cable, and the like) connecting the camera and the computer.

Portable devices such as a digital camera are brought to various places, and at any place, the transmission of data from the camera may be desired. In such a case, i.e., when data transmission becomes necessary, a cable, as noted above, is a necessary component. However, it is bothersome to carry a cable about with the digital camera. Furthermore, the shapes or types of cable connectors may be different, i.e., incompatible, if the type of the cable receptacle of the computer is different. Accordingly, even if a user brings a cable together with the camera, that cable cannot be used when the computer intended to receive the data has a different type of cable receptacle. Therefore, generally, it is difficult to transmit data from a digital camera to a computer.

Recently, an infrared data transmission standard called IrDA has become popular. The IrDA standard is intended to facilitate data transmission between a portable terminal (e.g., a digital camera) and computers following the IrDA standard, using infrared light.

Generally, to add an infrared data transmission function to a camera is difficult, because it causes an increase in cost and further requires an increase in the size of the camera body.

SUMMARY OF THE INVENTION

It is therefore an object of the invention to provide an improved camera which has an infrared light emitting element, an infrared light receiving element, and a distance measuring system. The distance measuring system incorporates the infrared light emitting element and the infrared light receiving element. The infrared light emitted by the infrared light emitting element and reflected by an object is received by the infrared light receiving element, and the distance to the object is determined based on a position of received light on a light receiving area of the infrared light receiving element. The camera is further provided with a data transmission system capable of sending data by modulating the infrared light emitted by the infrared light emitting element. Further, the data transmission system is capable of receiving data carried by the infrared light via the infrared light receiving element.

Optionally, the camera may be further provided with an image capturing system which captures image data of the object as digital data, and a memory in which the digital image data is stored.

Further optionally, data transmitted by the data transmission system may include the image data.

Further, the camera may be provided with an optical system which changes a light emitting angular range, the angular range being smaller when the infrared light is emitted for determining the object distance that when the infrared light is emitted for the data transmission.

Furthermore, the optical system may form the infrared light emitted towards the object into substantially parallel light when the infrared light is emitted for the distance measurement.

According to another aspect of the invention, there is provided a camera comprising an image capturing system which receives light from an object and generates digital image data; an image memory in which the digital image data is stored; a light emitting element which emits infrared light towards the object; a light receiving element which receives infrared light emitted by the light emitting element and then reflected by the object; a distance calculating system which calculates a distance to the object based on a position of the light receiving element where the reflected infrared light is incident; and a controller which controls the light emitting element to emit infrared light modulated in accordance with the digital image data stored in the image memory.

Optionally the infrared light may carry the image data as serial data.

Further, the camera may be provided with an optical system which changes an angular range of the infrared light emitted by the light emitting element, wherein the controller controls the optical system such that the angular range is greater when the modulated infrared light is emitted than when the infrared light is used for distance measurement.

According to further aspect of the invention, there is provided a camera comprising an image capturing system which receives light from an object and generates image data; an image memory in which the image data is stored; a light emitting element which emits infrared light towards the object; a light receiving element which receives the infrared light; a distance calculating system which calculates a distance to the object based on a position of incident light along the infrared light receiving element, the incident infrared light being emitted by the light emitting element, reflected by the object and incident to the light receiving element; and a demodulating system which demodulates a signal carried by the infrared light and transmitted from an external device to the light receiving element.

Optionally, the signal may carry the image data as serial data.

Further, the image data received by the light receiving element can be stored in the image memory.

DETAILED DESCRIPTION OF THE PREFERRED EMBODIMENTS

Figure 1:
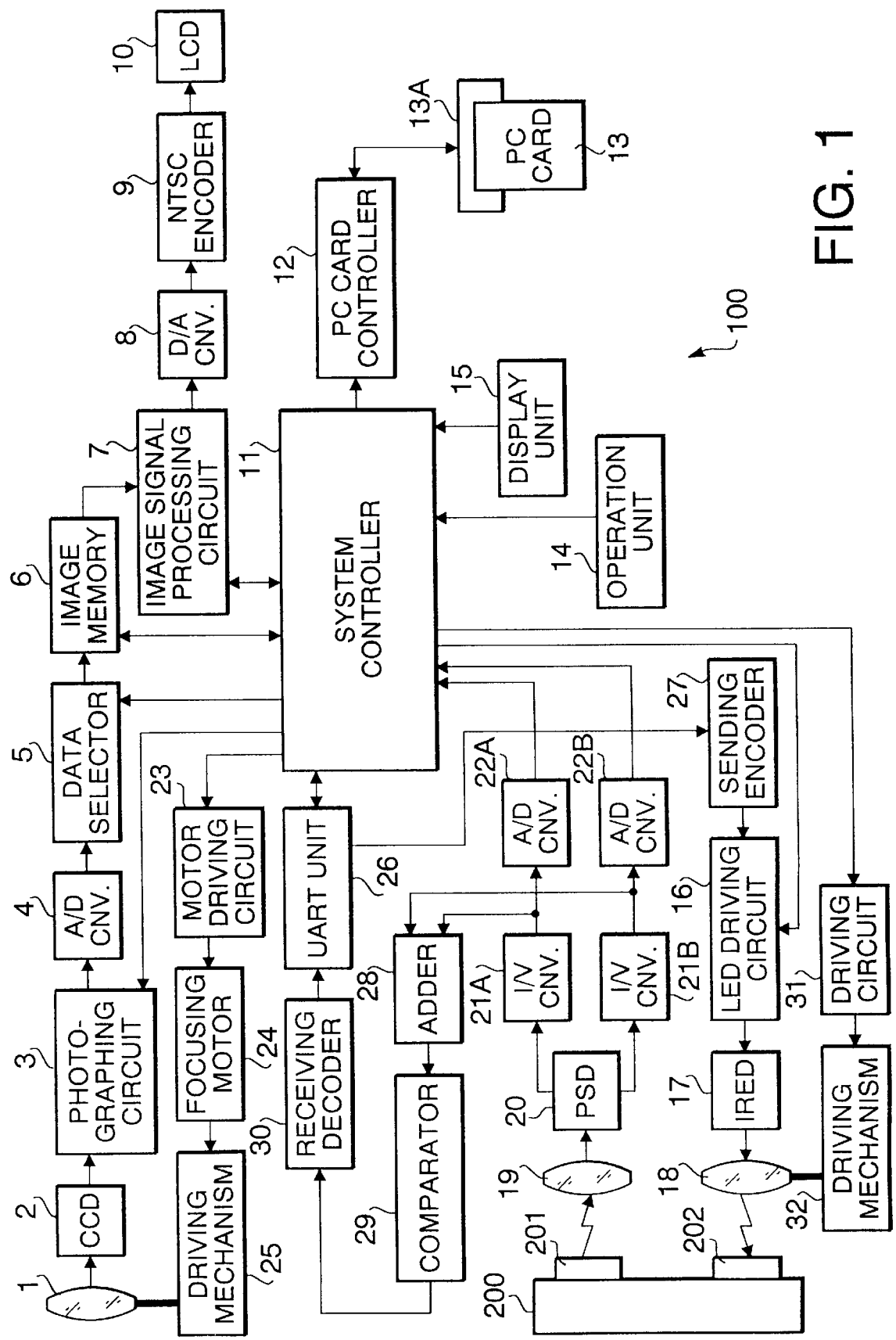
FIG. 1 is a block diagram illustrating a digital camera embodying the present invention.

FIG. 1 is a block diagram illustrating the electrical structure of a digital camera 100 embodying the present invention. The digital camera 100 has a photographing lens 1 which forms an object image onto a light receiving surface of a CCD 2. The CCD 2 outputs an image signal to a photographing circuit 3. The photographing circuit 3 converts a signal transmitted from the CCD 2 into an RGB signal (analog signal). The RGB signal is transmitted from the photographing circuit 3 to an A/D converter 4 and is there converted into a digital RGB signal and sent on to a data selector 5. The data selector 5 is a circuit which selectively transmits one of the output data of the A/D converter 5, and data received via data transmission. In the image memory 6, data is transmitted from the external device to the image memory 6, the data transmission being performed synchronously with a clock signal transmitted from the system controller 11.

The image data stored in the image memory 6 is then sent to the image data processing circuit 7. The image data processing circuit 7 is a circuit which performs gamma compensation, compression and the like.

Displaying of an image is carried out as described below. The image data is transmitted from the image data processing circuit 7 to the D/A converter 8. The image data is then converted into analog image data by the D/A converter 8, and further converted into an NTSC signal by the NTSC encoder 9. Then the NTSC signal is transmitted from the NTSC encoder 9 to the LCD monitor 10.

When the captured image is recorded, the compressed image data is transmitted from the image data processing circuit 7 to a PC card control circuit 12 through the system controller 11. The PC card control circuit 12 writes the compressed image data in the PC card 13 in accordance with a predetermined format. Note that the PC card 13 is inserted in a card unit 13A provided in the camera 100 when the above-described data recording is carried out.

The system controller 11 is provided with an operation unit 14 on which various operating members (e.g., buttons) for executing photographing, data recording in the PC card 13, data transmission (described later), and the like. Separately from the LCD monitor 10, a display unit 15 is provided to indicate the operating condition of the camera and the like.

Distance measurement is described below. In the digital camera 100, a so-called active distance measurement is performed using infrared light. In accordance with a triangulation method (a distance measuring method using triangulation), the infrared light is emitted from a light emitting unit towards an object, and the light reflected by the object is received by the light receiving unit. Based on the position on the light receiving unit where the reflected light is received, the distance from the camera 100 to the object is calculated.

The camera 100 has a infrared light emitting diode (hereinafter abbreviated as IRED) 17. The system controller 11 transmits a control signal to a light emitting diode driving circuit 16. In response to the control signal, the light emitting diode driving circuit 16 drives the IRED 17 to emit the infrared light. The infrared light emitted by the IRED 17 is refracted to be substantially parallel light by a projecting lens 18, and is emitted towards the object.

The infrared light reflected by the object is, through a receiving lens 19, received by a light receiving sensor (PSD: Position Sensing Device) 20. The PSD 20 outputs an electrical current corresponding to the position where the light is incident to I/V (current to voltage) converters 21A and 21B. The output voltage values of the I/V converters 21A and 21B are converted into digital values by A/D converters 22A and 22B, respectively, and are transmitted to the system controller 11. The system controller 11 calculates the distance from the camera to the object based on the digital data transmitted from the A/D converters 22A and 22B. Further, the system controller 11 drives the lens 1 in accordance with the calculated object distance to an in-focus position where the in-focus image is formed on the CCD 2. Specifically, the system controller 11 controls the motor driving circuit 23 to drive a motor 24. The driving force of the motor 24 is transmitted to a lens driving mechanism 25, which moves the lens in the optical axis direction of the lens 1.

A data transmit/receive unit (UART: Universal Asynchronous Receiver Transmitter) 26 generates data having a predetermined format when the data is to be transmitted and/or received. Sending of data is performed as follows: the UART 26 converts data to be sent into data having the predetermined format and stores the converted data in an image memory; then, in accordance with the data stored in the image memory, an infrared light transmitting encoder 27 outputs a driving signal to the light emitting diode driving circuit 16. Reception of data is executed as follows: the light incident to the camera 100 is received by the PSD 20; output values of the I/V converters 21A and 21B are added by an adder circuit 28; the output values of the adder circuit 28 are compared with a reference value by a comparator 29 and binarized data (a two-value, or on-off, data) are obtained; the binarized data output by the comparator 29 is converted into data having a predetermined data format by a receiving decoder 30, and is then transmitted to the UART 26.

In the present embodiment, the angular range of the emitted infrared light during the data transmitting/receiving operation is different from that during the distance measuring operation. That is, when the object distance is measured, it is preferable that the emitted light is directional so that the light reaches an object located relatively far from the camera. Conversely, when data transmission is executed, it is preferable that the light reaches an external device at various possible positions. In the camera 100 according to the embodiment, the position of the lens 18 is changed before the data transmission is performed, and before the distance measurement is performed. The lens 18 is driven to move by controlling a driving circuit 31 to drive a lens driving mechanism 32.

When data transmission to an external device 200 (e.g., a computer) is completed, a light receiving portion 202 of the external device 200 receives the modulated infrared light emitted from the lens 18 of the digital camera 100. Further, a light emitting portion 201 of the external device 200 emits modulated infrared light towards the lens 19 of the digital camera 100.

Figure 2:
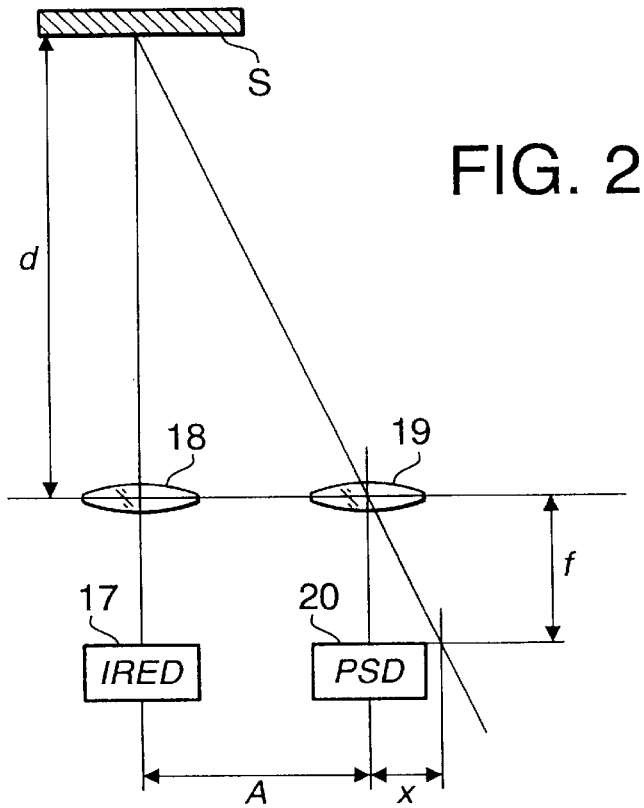
FIG. 2 illustrates a distance measuring system.

The triangulation method is described in detail with reference to FIGS. 2 and 3. In FIG. 2, the following equation (1) is satisfied:

$$d = A \cdot f / x \qquad (1)$$

where "d" is a distance from the lens 18 to the object S, "A" is a distance between the optical axes of the lenses 18 and 19, "f" is a distance from the lens 19 to the light receiving surface of the PSD 20, and "x" is a distance between the optical axis of the lens 19 and a point where the light is incident on the light receiving surface of the PSD 20.

Figure 3:
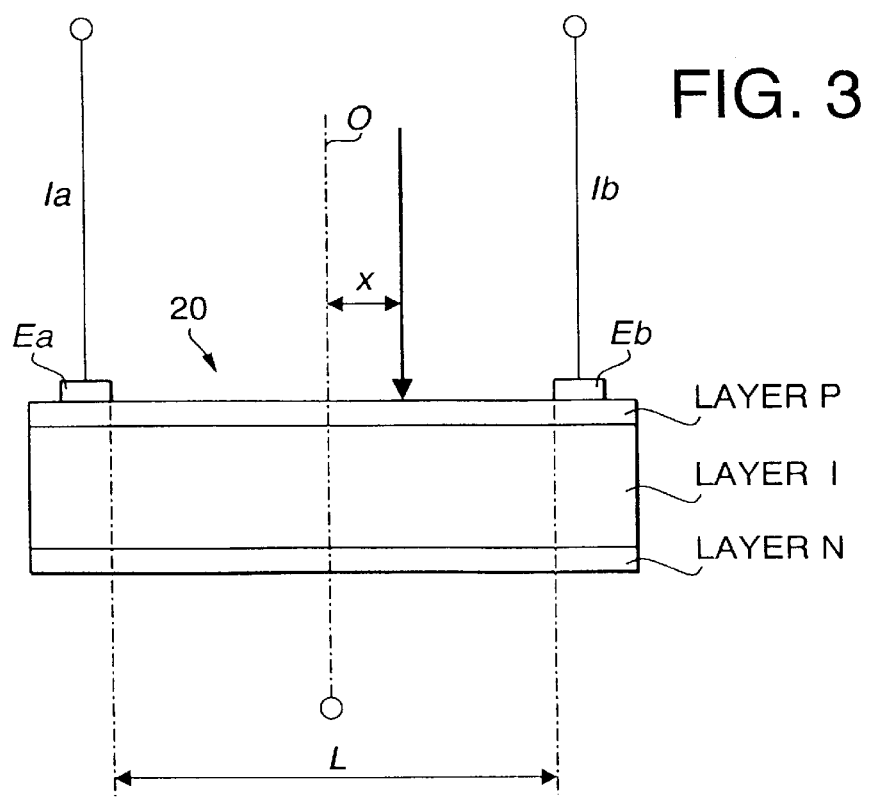
FIG. 3 shows a schematic structure of the light receiving element.

FIG. 3 is a cross sectional view of the PSD 20, showing a schmetic structure thereof. The PSD 20 has three layers, P, I and N. The layer P is the light receiving surface. On the surface of the layer P, a pair of output electrodes Ea and Eb are provided. In FIG. 3, the optical axis of the lens 19 is indicated as "O", and the distance between the electrodes Ea and Eb is "L". If the light is incident as indicated by an arrow (away from the optical axis O by a distance x), the following equation is satisfied:

$$Ia+Ib=Io$$

where, Ia is output current at the electrode Ea, Ib is an output current at the electrode Eb, and Io is the total current (i.e., the photoelectric current).

Since the current Ia and Ib are expressed as follows:

$$Ia=\frac{1}{2} \cdot (1-2/L \cdot x) \cdot Io, \text{ and}$$

$$Ib=\frac{1}{2} \cdot (1+2/L \cdot x) \cdot Io,$$

the following equation (2) is obtained:

$$x=L/2 \cdot (Ib-Ia)/(Ia+Ib) \qquad (2)$$

Accordingly, by measuring the currents Ia and Ib, the distance x can be calculated by the equation (2), and further the distance d can be calculated by the equation (1).

Figure 4:
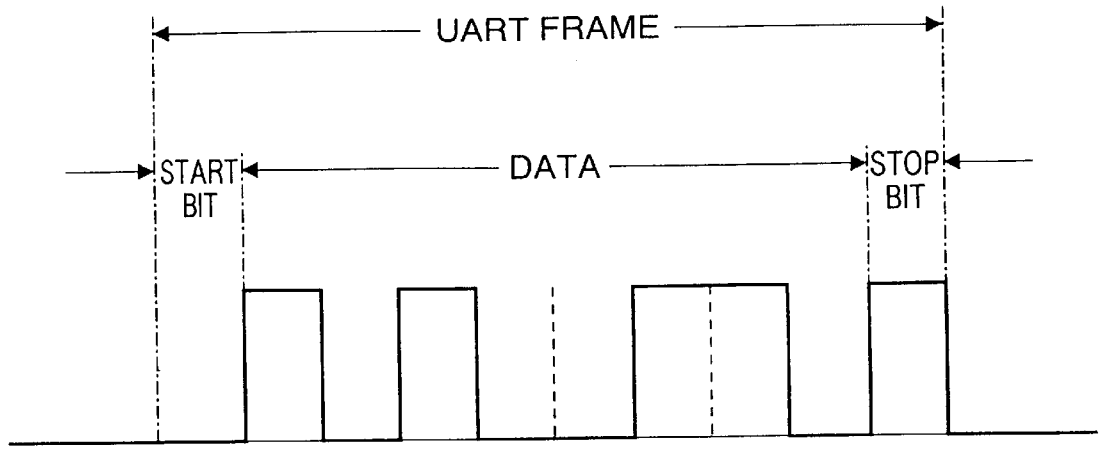
FIG. 4 illustrates a data structure of a UART frame.

FIG. 4 shows a data format (i.e., a UART data format) used in the sending/receiving unit (UART) 26. The UART format is serial data grouped in a plurality of frames, each frame including one start bit, eight data bits, and one stop bit. The UART data is sent/received synchronously with a clock signal having a predetermined clock frequency.

Figure 5:
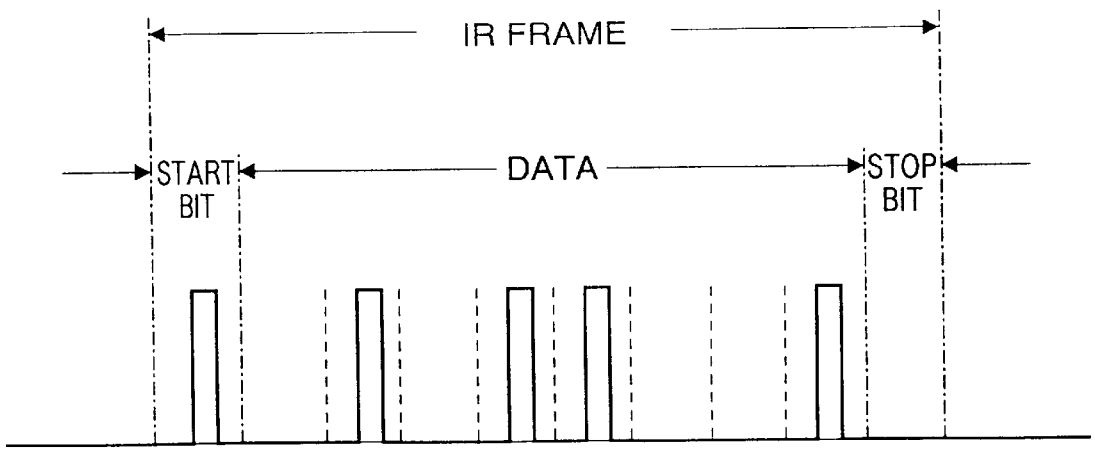
FIG. 5 illustrates a data structure of an IR frame.

FIG. 5 shows a data format (i.e., an IR data format) to be used for infrared light data transmission with the external device 200. The data having the UART format is transmitted from the UART 26 to the data sending encoder 27. The encoder 27 modulates the received data so as to have the IR format shown in FIG. 5. The data sent by the external device and received by the PSD 20 is therefore formatted in the IR format. The data having the IR format is sent to the received data decoder 30, which demodulates the data having the IR format so as to have the UART format as shown in FIG. 4. The data as demodulated is sent to the UART unit 26.

In accordance with the format shown in FIG. 5, a pulse width of a logical high pulse is 3/16 of an entire period for one bit. In other words, in a data frame when the data transmission is executed, if the infrared light is emitted for a period which is 3/16 of a period for one bit that is defined by the clock signal, the bit is regarded as to be the logical high. Because the period in which the light emitting diode is turned on in order to transmit logical high is made relatively short, power consumption is reduced.

Figure 6:
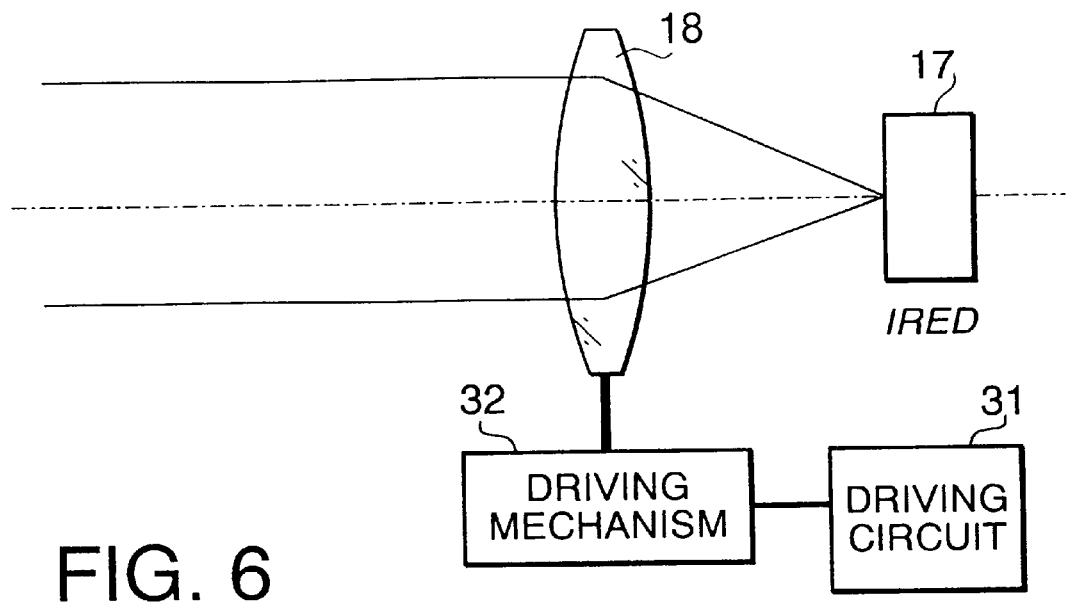
FIG. 6 shows a positional relationship between the lens and a light emitting diode when distance measuring is carried out.
Figure 7:
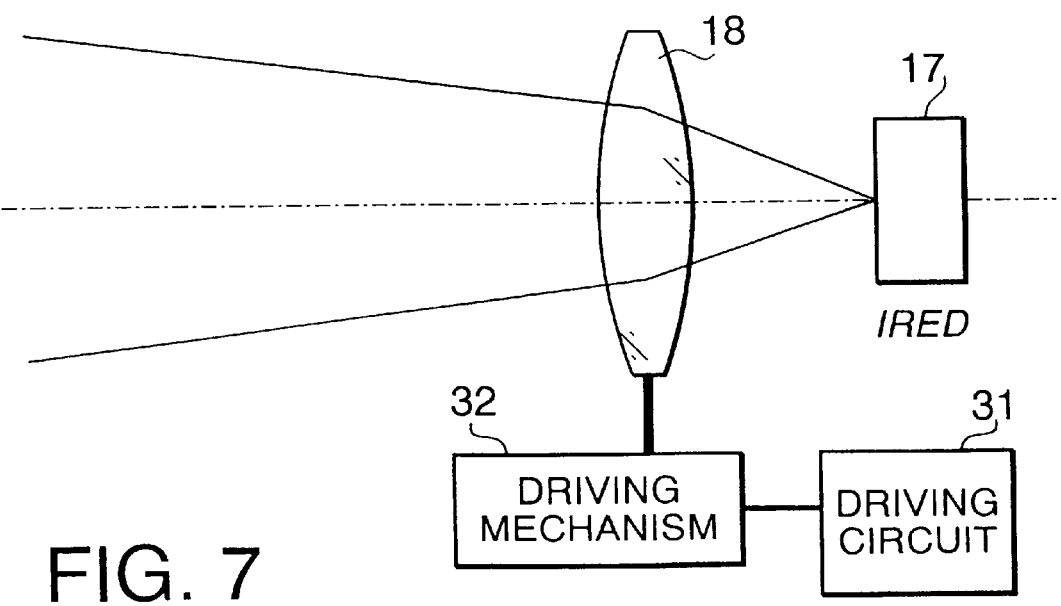
FIG. 7 shows a positional relationship between the lens and the light emitting diode when data transmission is carried out.

FIGS. 6 and 7 show positions of the lens 18 when the distance measurement is carried out and when the data transmission is carried out, respectively.

FIG. 6 shows the lens 18 position when the distance measurement is performed. When the distance is measured, as previously described, it is preferable that the light is not attenuated. Therefore, the lens 18 is positioned such that the focal point of the lens 18 substantially coincides with the light emitting diode (IRED), and substantially parallel light is emitted towards the object.

FIG. 7 shows the lens position when data transmission is executed. In this case, data transmission is to be performed with one external device 200. When the data transmission is performed with the external device 200 using infrared light, the distance between the external device 200 and the digital camera 100 is relatively small. In infrared light data transmission, it is important that the infrared light is properly exchanged between the camera 100 and the external device 200. Accordingly, it is preferable that the emitted light has a relatively large angular range. When the emitted light has a large angular range, the light may be attenuated within a short distance. However, as described above, because the external device 200 is located close to the digital camera 100, attenuation is not a problem. If the angular range is small, the camera 100 should be correctly positioned such that the light is directed to the light receiving portion 202 of the external device 200. Because the infrared light is not visible, the positioning of devices transmitting an infrared light signal is relatively difficult. In the embodiment, therefore, the angular range is made relatively large, so that the positioning of the camera 100 and the external device 200 is not necessarily critical, and data transmission can still be performed. As shown in FIG. 7, when data transmission is performed, the distance between the lens 18 and the light emitting diode (IRED) 17 is closer to the focal length of the lens. With this positional relationship, the infrared light emitted through the lens 18 diverges within a certain angular range.

Figure 8:
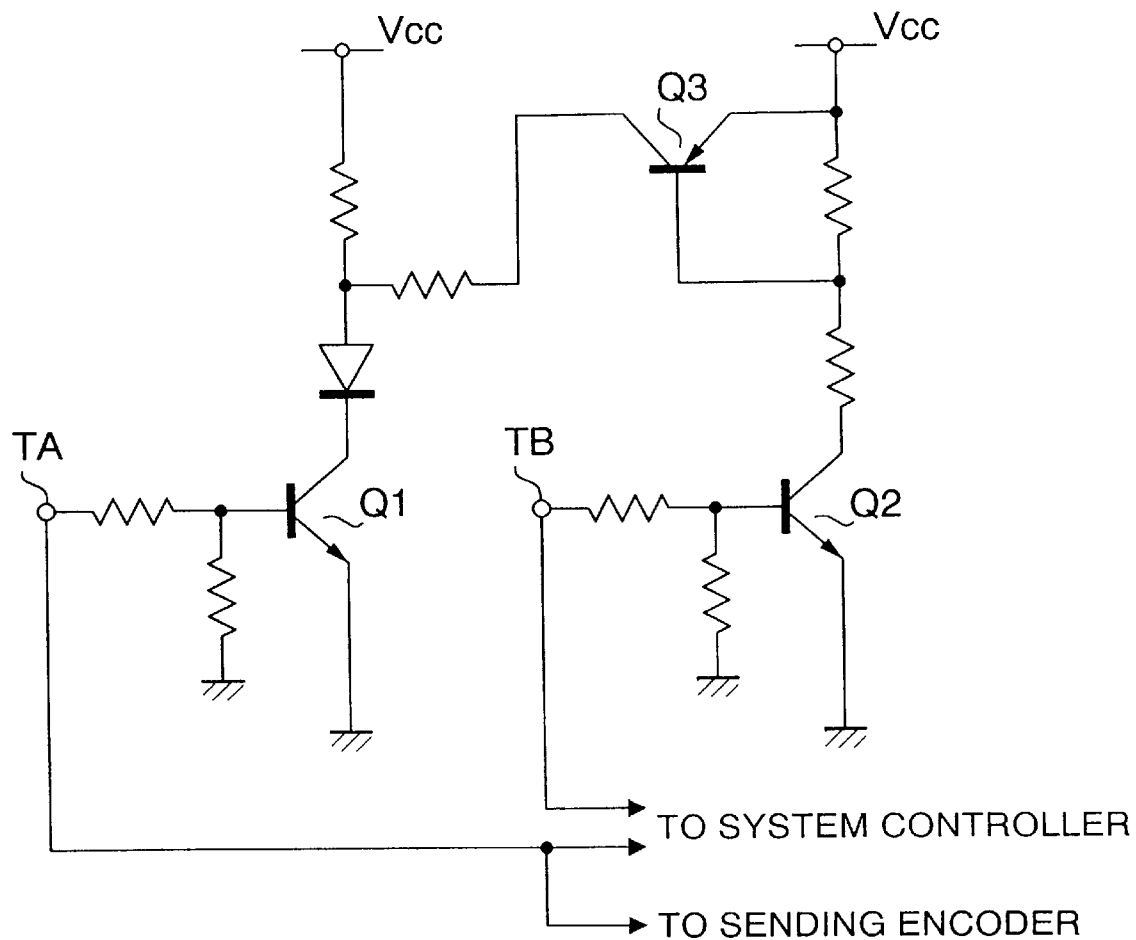
FIG. 8 shows a driving circuit of the light emitting diode.

FIG. 8 shows the driving circuit 16 of the light emitting diode (IRED) 17. When distance measurement is performed, in order to receive the light reflected from the object, the intensity of emitted light should be sufficiently great. On the other hand, when data transmission is performed, because the external device 200 is close to the camera 100, and in order to avoid emitting light that might affect the operation of ambient devices (especially those having similar data receiving devices), the intensity of the emitted light is sufficiently reduced.

In the driving circuit shown in FIG. 8, when distance is measured, the system controller 11 supplies logical high signals to terminals TA and TB in order to turn on transistors Q1, Q2 and Q3. In this condition, the intensity of the light emitted by the light emitting diode (IRED) 17 is relatively great. When data transmission is executed, the system controller 11 sends the driving signal (i.e., the logical high signal) only to the terminal TA. Accordingly, only the transistor Q1 is turned on. In this condition, the intensity of light is decreased.

Figure 9:
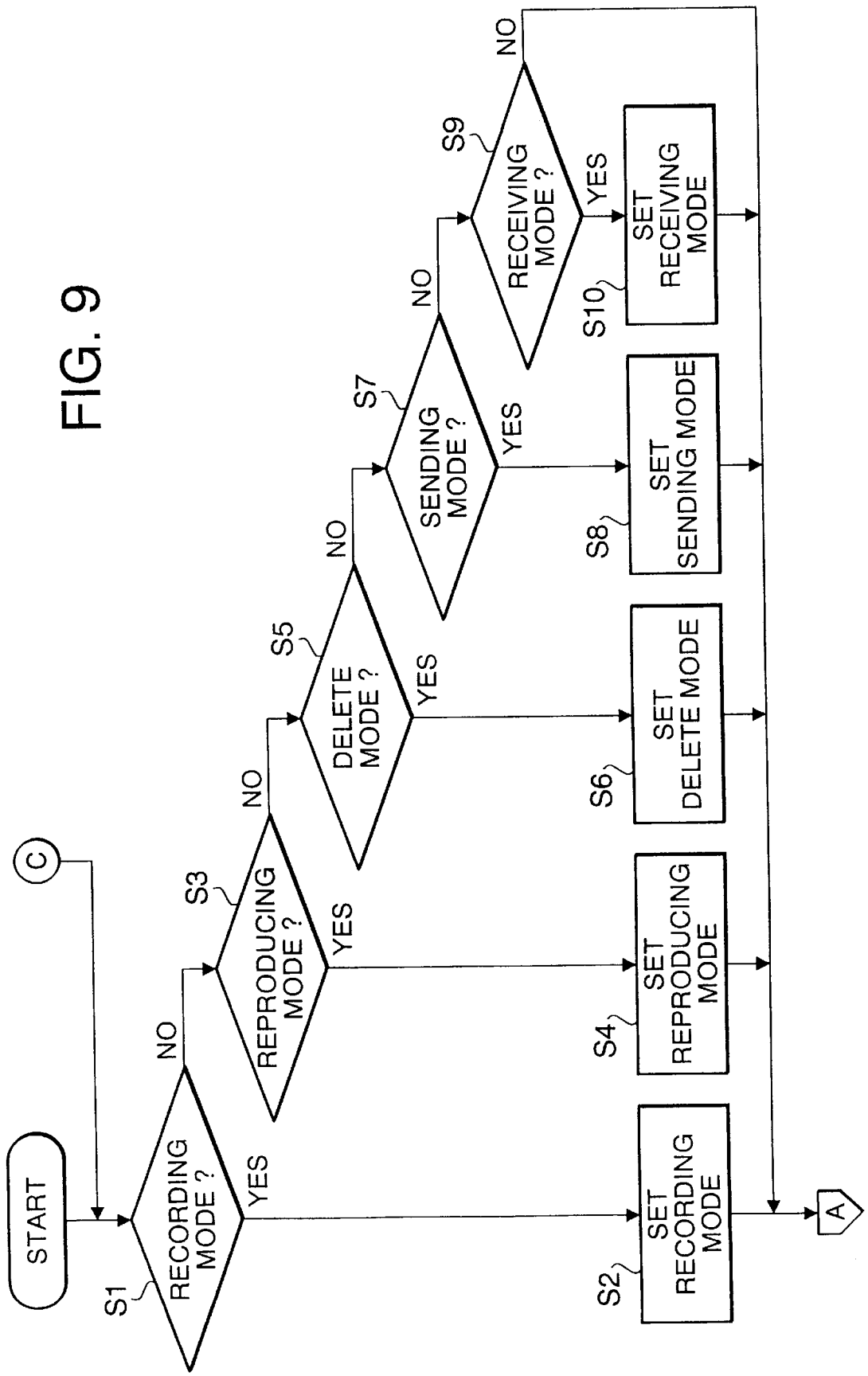
FIGS. 9 through 11 show a flowchart illustrating the operation of the digital camera.
Figure 10:
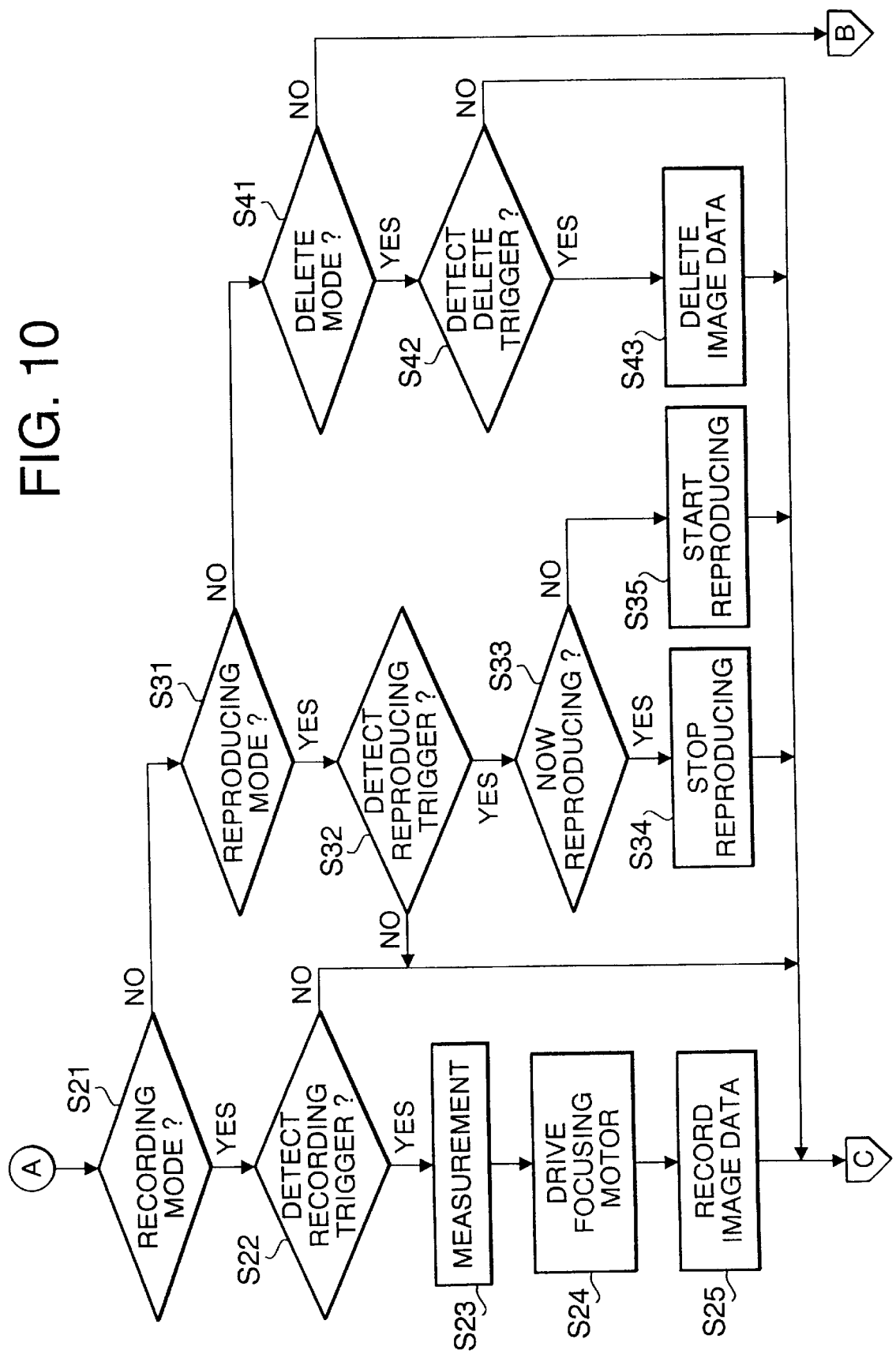
Figure 11:
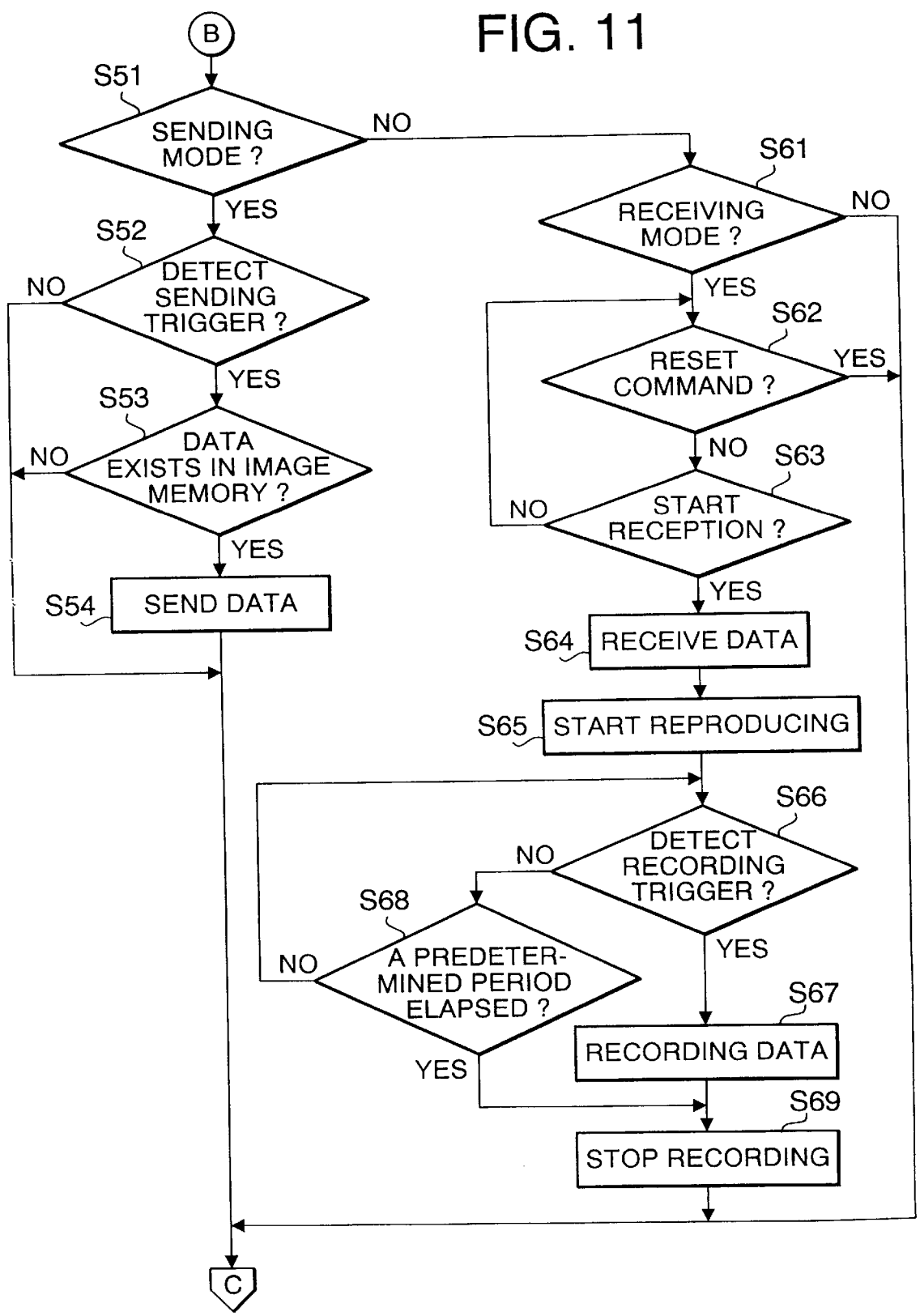

FIGS. 9 through 11 show a flowchart illustrating an operation of the digital camera 100.

The digital camera 100 is operable in the following five operation modes:

(1) Recording Mode: Data stored in the image memory 6 is recorded in the PC card 13;

(2) Reproducing Mode: Image is reproduced and displayed on the LCD 10 based on the data stored in the image memory 6;

(3) Delete Mode: Data stored in the PC card 13 is deleted;

(4) Sending Mode: Data stored in the image memory 6 is sent using infrared light; and (5) Receiving Mode: Data received via infrared light is stored in the image memory 6.

By operating a mode selection switch (not shown) provided in the operating unit 14, one of the above five modes is selected.

At steps S1, S3, S5, S7 and S9, the system controller 11 determines which mode is selected in accordance with the operated condition of the mode selecting switch. In accordance with the selected mode, an operation condition of the camera 100 is set (S2, S4, S6, S8 or S10). Note that data transmission (sending/receiving) is performed using infrared light between the camera 100 and the external device 200. Accordingly, the sending mode or the receiving mode is selected, and the camera 100 and the external device 200 are positioned such that infrared light can be transmitted. When the sending mode or the receiving mode is selected, the system controller 11 negotiates with the external device 200 to adjust the transmission condition or the like (not shown in the flowchart).

FIGS. 10 and 11 shows operations in the respective modes.

If the recording mode is selected, the judgment at S21 is YES. In the recording mode, a release button of the camera 100 functions as a trigger button. That is, when the release button is operated, the system controller detects the operation of the release button and outputs a recording trigger signal (S22:YES). Subsequently, the distance measurement is performed, and the system controller 11 controls the focusing motor 14 to drive the driving mechanism 25 to position the focusing lens 1 to the in-focus position (S24). The system controller 11 then stores the image data in accordance with the image signal output by the CCD 2, and then writes the image data to the PC card 13 after compressing the same (S25).

When the reproducing mode is selected, the determination at S31 is YES. In the reproducing mode, the release button functions as a reproducing trigger button. That is, when the release button is operated, reproducing the image based on the image memory 6 is executed (S35), unless the reproducing operation is currently performed (S33:NO).

The reproducing operation is performed as follows. First, the data stored in the PC card 13 is transferred via the PC card control circuit 12 and the system controller 11, to the image memory 6. The data thus stored in the image memory 6 is compressed data. The compressed data is expanded by the image signal processing circuit 7, and the expanded signal is converted into an analog signal by the D/A converter 8. The analog signal is further converted into an NTSC signal by the NTSC encoder, and is then displayed on the LCD 10.

If the release button is operated in the reproducing mode while the image data stored in the image memory 6 is currently reproduced (S33:YES), reproducing is terminated (S34). Therefore, reproducing is initiated when the release button is operated only when reproducing is not currently executed, and reproducing is terminated when the release button is operated while the reproducing is currently performed.

When the delete mode is selected, the determination at S41 is YES. In the delete mode, by operating a delete button (not shown) provided on the operation unit 14, a delete trigger signal is output. When the delete trigger signal is input in the system controller 11 (S42), data stored in the PC card 13 is deleted (S43). In the embodiment, in order to prevent deletion of the data due to an erroneous operation, the delete button is provided separately of the release button, and should be operated when the delete mode is selected.

When the transmission mode is selected, the judgment at S51 is YES. In the transmission mode, the release button functions to generate a transmission trigger. When the release button is operated, the transmission trigger is output from the operation unit 14. When the system controller detects the transmission trigger (S52:YES), only if the image data is stored in the image memory 6 (S53:YES), data transmission is executed using infrared light. If there is no data stored in the image memory 6 (S53:NO), the data transmission is not performed.

If the reception mode is selected, the judgment at step S61 is YES. In the reception mode, the system controller 11 operates in a data reception stand-by condition. That is, until the data is transmitted from the external device 200, the determination at S63 remains NO. Accordingly, steps S62 and S63 are repeated until data is transmitted from the external device 200.

At S62, the system controller 11 determines whether a reception mode reset command is issued. If the camera 100 operates in the reception mode, and no data has transmitted from the external device 200, the determination at S63 is NO, and the control returns to S62. Therefore, if data transmission from the external device is terminated, the data reception stand-by condition (i.e., a loop formed by steps S62 and S63) continues.

In order to diverge from the loop, the determination at S62 is made. That is, if there is an operation which cancels the reception mode (e.g., an operation of the mode selection switch to select an operation other than the reception mode), the determination at S62 becomes YES, and control returns to S61. Otherwise, steps S62 and S63 are repeated until the data is transmitted from the external device 200.

While S62 and S63 are repeated, if data is transmitted from the external device 200 (S63:YES), the system controller 11 receives the data and stores the data in the image memory 6 (S64). When the storing of data in the image memory 6 is finished, the data reception operation is completed, and the image is then reproduced (S65). If the release button is operated while the image is displayed on the LCD 10 (i.e., if the recording trigger is detected), the data stored in the image memory 6 is written in the PC card 13 (S67). If the recording trigger signal is not detected within a predetermined duration of time while the image is displayed on the LCD (S66:NO; and S68:YES), reproducing of the image is prohibited, and the operation is completed.

According to the digital camera as described above, an infrared light emitting element for distance measurement is used for data transmitting, and the light receiving element for distance measurement is used by the data receiving unit for receiving the data transmitted from the external device. Accordingly, without increasing the size of the camera or employing extra devices, an infrared data transmission function can be added.

Furthermore, power consumption of the light emitting diode can be reduced when the data transmission is performed. Accordingly, even if the data transmission function is additionally provided, power consumption is satisfactory.

Furthermore, when data is transmitted, the light emitting angular range is relatively great.

The present disclosure relates to subject matter contained in Japanese Patent Application No. HEI 7-323908, filed on Nov. 17, 1995, which is expressly incorporated herein by reference in its entirety.

What is claimed is:

1. A camera, comprising:

an infrared light emitting element;

an infrared light receiving element;

a distance measuring system, said distance measuring system including said infrared light emitting element and said infrared light receiving element, said infrared light receiving element receiving said infrared light emitted by said infrared light emitting element and reflected from an object, a distance to said object being determined based on a position of received light on a light receiving area of said infrared light receiving element;

a data transmission system, said data transmission system sending data by modulating said infrared light emitted by said infrared light emitting element, said data transmission system receiving data carried by said infrared light via said infrared light receiving element;

a system that controls said infrared light emitting element to vary an intensity of said infrared light emitted by said infrared light emitting element so that high intensity infrared light is utilized by said distance measuring system to measure a distance to said object and low intensity infrared light is utilized by said data transmission system to send data; and an optical system which changes a light emitting angular range so that a parallel beam is emitted towards the object when the infrared light is emitted for determining the object distance and a divergent beam is emitted towards the object when the infrared light is emitted for the data transmission.

2. The camera according to claim 1, further comprising:

an image capturing system which captures digital image data of said object; and a memory in which said digital image data is stored.

3. The camera according to claim 2, wherein said data transmitted by said data transmission system includes said digital image data.

4. The camera according to claim 1, said optical system comprising a lens and a moving system that changes a position of said lens with respect to a light emitting surface of said infrared light emitting element.

5. The camera according to claim 4, said moving system positioning said lens so that a focal point of said lens substantially coincides with a surface of said infrared light emitting element when said infrared light is utilized for determining a distance to said object, said moving system positioning said lens closer to said light emitting element than a focal length of said lens when said infrared light is utilized for data transmission.

6. A camera, comprising:

an image capturing system which receives light from an object and generates digital image data;

an image memory in which said image data is stored;

a light emitting element, which emits infrared light toward said object;

a light receiving element, which receives said infrared light emitted by said light emitting element after said infrared light is reflected by said object;

a distance calculating system, which calculates a distance to said object based on a position of received light on said light receiving element;

a controller, which controls said light emitting element to emit infrared light modulated in accordance with said image data stored in said image memory;

a system that controls said light emitting element to vary an intensity of infrared light emitted by said light emitting element so that high intensity infrared light is utilized by said distance calculating system to calculate a distance to said object and low intensity infrared light is utilized by said controller to modulate said infrared light in accordance with image data; and an optical system which changes an angular range of the infrared light emitted by the light emitting element, the controller controlling the optical system such that the angular range is greater and a divergent beam is emitted towards the object when the modulated infrared light is emitted and a parallel beam is emitted towards the object when the infrared light is used for distance measurement.

7. The camera according to claim 6, wherein said modulated infrared light is modulated as serial data.

* * * * *

UNITED STATES PATENT AND TRADEMARK OFFICE
CERTIFICATE OF CORRECTION

PATENT NO. : 6,023,292

DATED : February 8, 2000

INVENTOR(S) : Yoshio Wakui

It is certified that error appears in the above-identified patent and that said Letters Patent is hereby corrected as shown below:

Column 9, line 10, delete "towards the object".

Column 10, line 25, delete "towards the".

Column 10, line 26, delete "object".

Signed and Sealed this

Fifteenth Day of August, 2000

Attest:

Q. TODD DICKINSON

*Attesting Officer*      *Director of Patents and Trademarks*